US007667730B2

(12) United States Patent
Wren et al.

(10) Patent No.: US 7,667,730 B2
(45) Date of Patent: Feb. 23, 2010

(54) COMPOSITE SURVEILLANCE CAMERA SYSTEM

(75) Inventors: Christopher R. Wren, Arlington, MA (US); Ali J. Azarbayejani, Boston, MA (US); Paul H. Dietz, Hopkinton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1168 days.

(21) Appl. No.: 11/153,205

(22) Filed: Jun. 15, 2005

(65) Prior Publication Data

US 2006/0284971 A1    Dec. 21, 2006

(51) Int. Cl.
*H04N 7/00*    (2006.01)
(52) U.S. Cl. .......................................... 348/36; 348/42

(58) Field of Classification Search ................... 348/36, 348/42, 61
See application file for complete search history.

(56) References Cited

U.S. PATENT DOCUMENTS 6,219,090 B1 *    4/2001    Nalwa ........................ 348/36

* cited by examiner

*Primary Examiner*—Allen Wong
(74) *Attorney, Agent, or Firm*—Dirk Brinkman; Gene Vinokur

(57) ABSTRACT

A method and apparatus acquires images of a scene with an omni-directional imager and a pan-tilt-zoom imager. A relationship between pixels in the input image and locations in the scene is expressed in terms of polar coordinates. An event is detected in the input images and the omni-directional pan-tilt-zoom camera is directed at the event in the scene using the relationship expressed in the polar coordinates.

31 Claims, 5 Drawing Sheets

100

COMPOSITE SURVEILLANCE CAMERA SYSTEM

FIELD OF THE INVENTION

This invention relates generally to surveillance systems, and more particularly to surveillance systems that use pan-tilt-zoom cameras.

BACKGROUND OF THE INVENTION

A pan-tilt-zoom (PTZ) camera can acquire a high angular resolution image or video of a small portion of a hemispherical scene by setting the field of view to a narrow angle. However, while the camera is directed on the small portion of the scene, the remaining portion of the scene cannot be viewed. Several solutions to this problem are known.

Temporal Multiplexing

In temporal multiplexing, the field of view of the PZT camera is normally set to a very wide angle and short focal length to acquire low detail, wide field of view images. When more detail is required, the PZT camera is directed at a particular portion of the scene to acquire narrow field of view images. Typically, this is done manually. For example, a user locates a significant surveillance event in the scene from the wide field of view images. The event can be a moving object, such as a person, car, door, or a other change in the environment, e.g., smoke or fire. Then, the user manually directs the camera at the event to acquire more detailed images. As an advantage, all images are acquired by a single camera. However, as a disadvantage, the wide angle and detailed images cannot be acquired at the same time, which may cause some significant events to go undetected.

Distributed Sensors

Multiple sensors can be distributed in an environment along with a single PTZ camera. For example, the sensors can be fixed cameras or motion detectors. In this arrangement, the sensors detect events and the PZT camera is directed at the events. For example, if a sensor detects the opening of a door, then the PTZ camera can be directed at the door. As an advantage, events can still be detected while the PZT camera is directed elsewhere. However, for this type of system to operate, the PZT camera and the sensors must be calibrated so that each sensor is mapped to a particular geometric orientation of the PTZ camera. This problem is repeated every time the configuration of the environment changes. If the system is operated manually, it may be difficult to direct the PZT camera at events in a timely manner, due to the perceptual gap between the sensor network observations, and the PTZ control space.

Multiple Cameras

It is also possible to use a wide-angle camera in conjunction with a PZT camera. This arrangement also requires calibration, particularly when the wide angle camera and the PZT camera are manufactured as separate units. If the fields of view of the two cameras have some overlap, then manual operation of the system is relatively easy. As a disadvantage, extremely wide-angle refractive lenses are expensive, and such lenses cause significant non-linear distortions, which make it difficult to calibrate the system for automatic operation. However, the worst aspect of this arrangement is that cameras with refractive lenses are a bad match for PTZ cameras. For example, if the PTZ camera is placed in a corner, then the camera can only view about one eighth of the view sphere and a moderately wide-angle refractive lens is sufficient. However, most PTZ cameras are capable of viewing at least a hemisphere, and many can view far more than that. Covering such a wide field of view with a single refractive lens is not possible. Adding cameras increases the calibration cost and the likelihood of the perceptual gap problem described above.

Virtual PTZ

One could construct a virtual PTZ camera by combining a single, high-resolution sensor with wide-angle optics. The system can then decode both wide-angle frames, as well as high-resolution detailed frames from a sequence of images. However, this is not generally practical.

For example, the Sony SNC-RZ30N camera has a 1-25× zoom lens. At a widest setting, the camera has a 25° horizontal field of view. This means that each pixel represents roughly $4.6 \times 10^{-7}$ steradians of the view sphere. Furthermore, the camera can observe about $3\pi$ steradians of the view sphere. Therefore, a single-sensor camera requires at least $20 \times 10^6$ pixels to replicate the acuity of the wide-angle setting of the PTZ camera. For the narrow-field, the camera has over 25 times the angular resolution, so a single image sensor needs at least $25^2$ more pixels, or $13 \times 10^9$ pixels, which is about a thousand times the resolution of currently available cameras. Even if a gigapixel sensor could be manufactured, the cost of communicating all those pixels as a video stream would be prohibitive.

SUMMARY OF THE INVENTION

A surveillance system includes a composite camera. The composite camera includes an omni-directional (OD) imager and a pan-tilt-zoom (PZT) imager. The OD imager acquires OD images of a scene. A relationship between pixels in the OD images and locations in the scene is expressed in terms of polar coordinates. An event is detected in the OD images acquired of the scene. Then, the PZT imager is directed at the events using the relationship expressed in the polar coordinates. After the PZT imager is directed, detailed PZT images can be acquired of the event by the PZT imager.

DETAILED DESCRIPTION OF PREFERRED EMBODIMENTS

Figure 1:
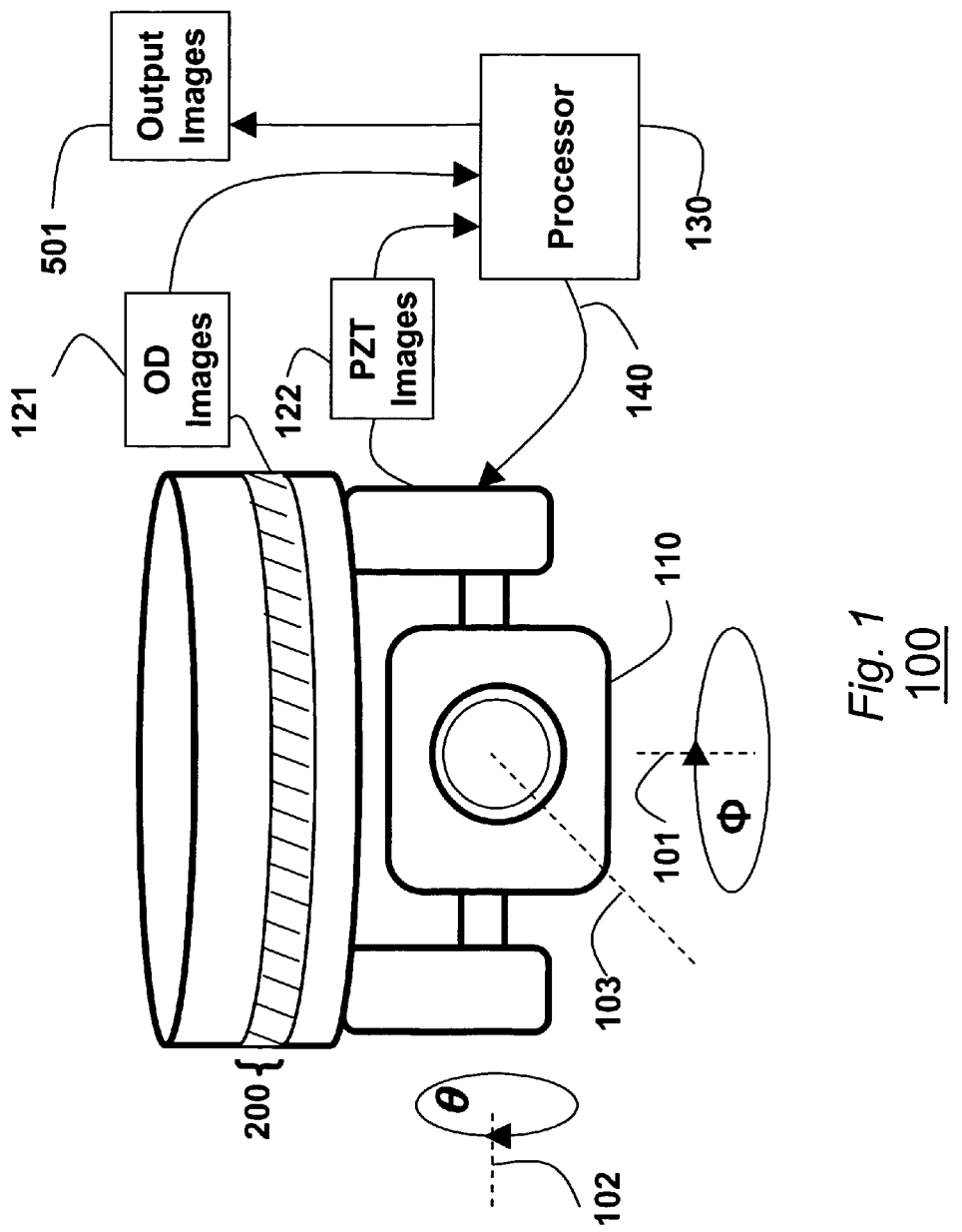
FIG. 1 is a block diagram of a composite camera according to one embodiment of the invention.

FIG. 1 shows a composite camera 100 according to one embodiment of the invention. The composite camera 100 includes an omni-directional (OD) imager 200, and a pan-tilt-zoom (PZT) imager 110. The optical centers of the OD and PZT imagers are substantially colocated. That is, any difference in their locations can be ignored for practical applications, as described below.

The OD imager 200 acquires OD images 121 of a scene. The PTZ imager 110 is mounted to rotate about a vertical axis 101 and a horizontal axis 102. The PZT imager can also zoom along an optical axis 103 of the imager. The PZT imager acquires PZT images 122 of the scene. The OD images 121 are processed by processor 130 as described below. The result of the processing can then be used to direct 140 the PTZ imager 110 at events in the scene. Events can be moving objects, e.g., people, cars, and/or doors; or changes in the environment, e.g., water, smoke, and/or fire. The processor can also generate output images 501 as described below.

Figure 2:
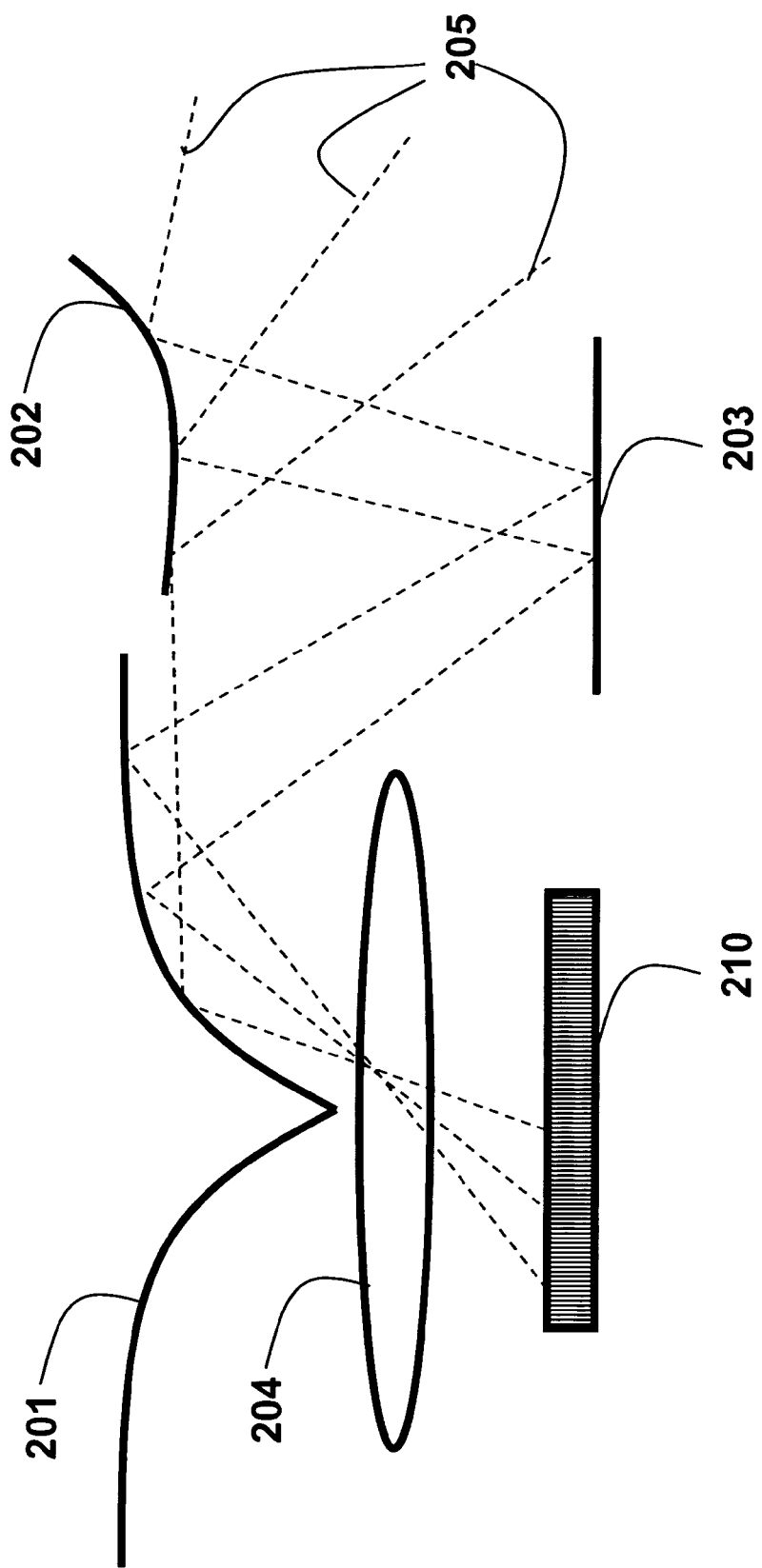
FIG. 2 is a block diagram of optical components of the composite camera of FIG. 1.

As shown in FIG. 2, the OD imager 200 includes catadioptric components. The catadioptric components include mirrors 201-203, and a lens 204 directing light rays 205 from a scene to an imaging sensor 210, e.g., a CCD. The catadioptric components combine mirrors (catoptrics), and lenses (dioptrics) to provide an omni-directional view of the scene. Generally, the mirrors are rotationally symmetric, as shown.

In other embodiments, other configurations of the catadioptric components are possible. For example, the OD imager can include multiple refractive elements. The only requirement is that the relationship of the components can be projected to polar coordinates. Numerous catadioptric systems are known in the art.

Figure 3:
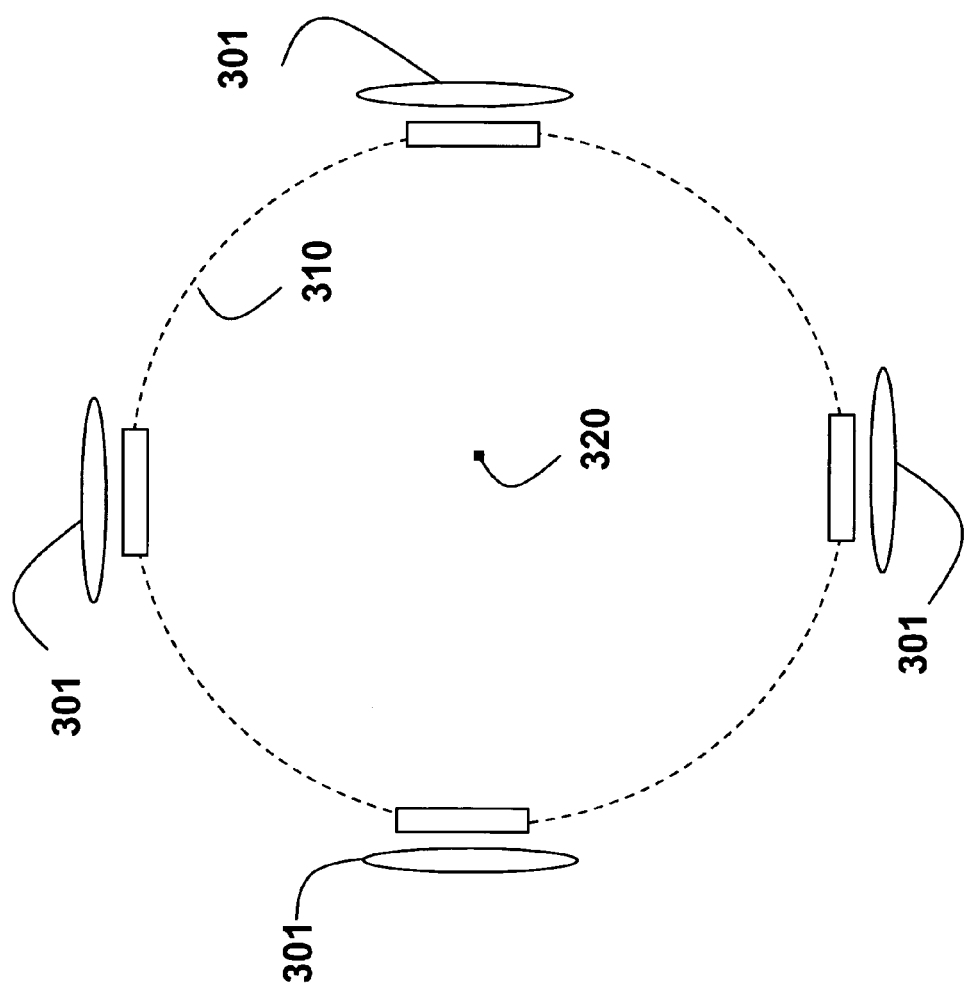
FIG. 3 is a block diagram of an alternative embodiment of the composite camera.

FIG. 3 shows one embodiment where multiple OD imagers 301 are arranged at a circumference 310 about an optical center 320 of the composite camera 100. If four imagers are used, then each imager has a 90° field of view. If eight imagers are used, then each imager only needs a 45° field of view.

Figure 4:
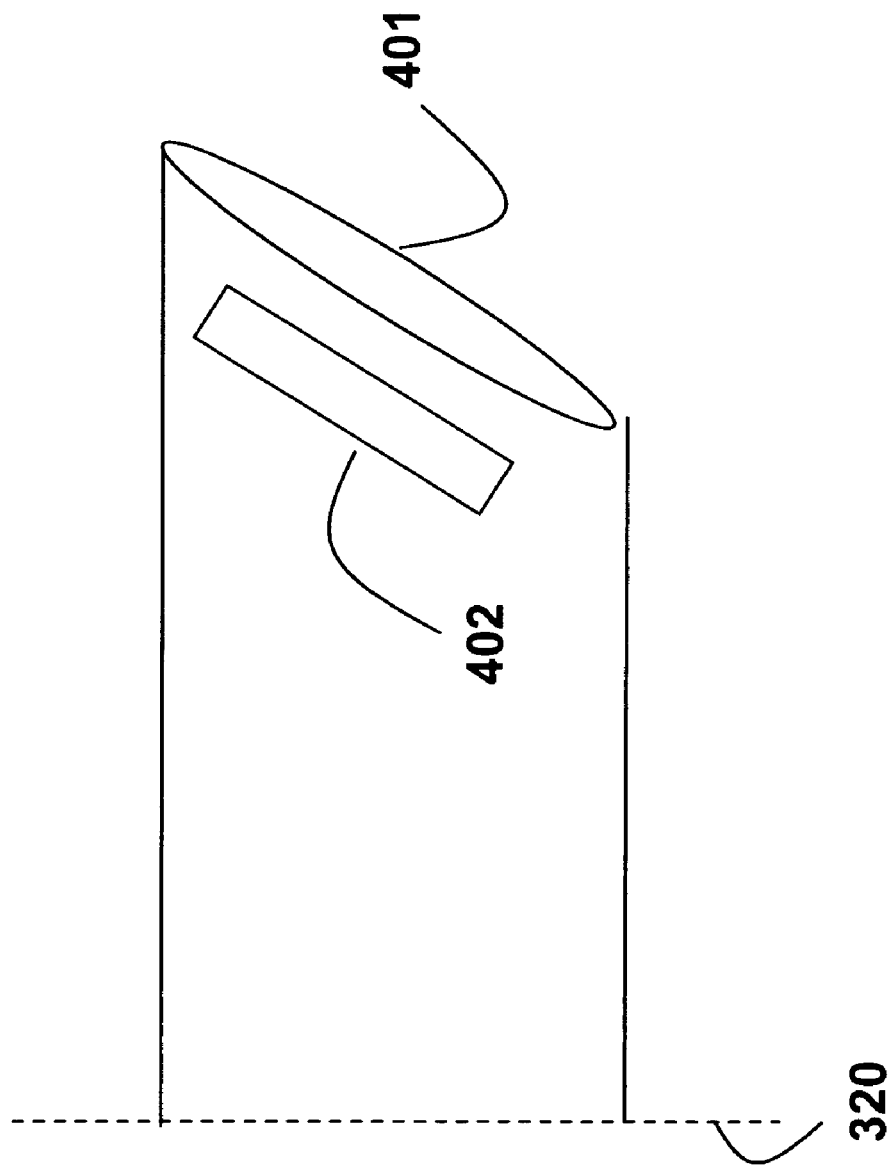
FIG. 4 is a block diagram of optical components of the composite camera of FIG. 3.

FIG. 4 is a side view of one of the imagers, with a lens 401 and sensor 402. In this configuration, the camera 100 is ceiling mounted to obtain a view of the scene from above.

For the OD images 121 acquired by the OD imager 200, there is a mathematical relationship between pixels in the images and locations in the scene. This relationship is expressed in polar coordinates. This relationship is used to direct the PZT imager 110 at specific locations in the scene. The relationship depends on the specific construction of the OD imager. For example, the specific case of a parabolic mirror is expressed as:

$$\phi = \arctan((y-y_0)/(x-x_0)) \tag{1}$$

$$\theta = \arctan(\mathrm{sqrt}((y-y_0)^2+(x-x_0)^2)/h), \tag{2}$$

where $\phi$ and $\theta$ are the polar coordinates of an incoming light ray imaged at a pixel (x, y), and a tuple $(x_0, y_0, h)$ are calibration parameters, which can be determined from a single OD image.

The camera 100 pans and tilts about its optical center. The optical centers of the imagers 110 and 200, for most practical applications, can be considered co-incident. Therefore, the polar coordinates $(\phi, \theta)$ can be mapped directly to pan and tilt coordinates for the PZT imager with a pair of offset parameters $(\phi_0, \theta_0)$, which can also be determined from the OD images.

The calibration parameters $(x_0, y_0, h, x_0, y_0)$ for the composite camera system depend only on the internal relationship of the optical components. Therefore, these parameters can be predetermined, e.g., at time of manufacture of the composite camera 100.

The OD images 121 can be processed with conventional computer vision techniques. These techniques can include: scene change detection, object detection and recognition (including faces), object tracking, and pattern recognition. These computer vision techniques can be used to detect, for example, significant surveillance events in the scene.

If an orientation of the scene needs to be known, then a local real-world 'up' direction can be based on the particular OD image being processed. Alternatively, the OD images can be pre-warped to polar coordinates before processing. This maps vertical lines in the world to vertical lines in the OD images, and conventional image processing techniques can be applied without modification.

If an event is detected in the OD images, then the PZT imager 110 can be directed at the event according to Equations 1 and 2. An appropriate zoom setting can be based on a size of a region in the scene that includes the event, as determined by the image processing techniques. When the size of the region is known in polar coordinates, then the focal length of the zoom lens can be set according that field of view, where the field of view $\alpha$ is expressed in radians, and the focal length f is:

$$f = \frac{1}{2}\arctan(\alpha). \tag{3}$$

Figure 5:
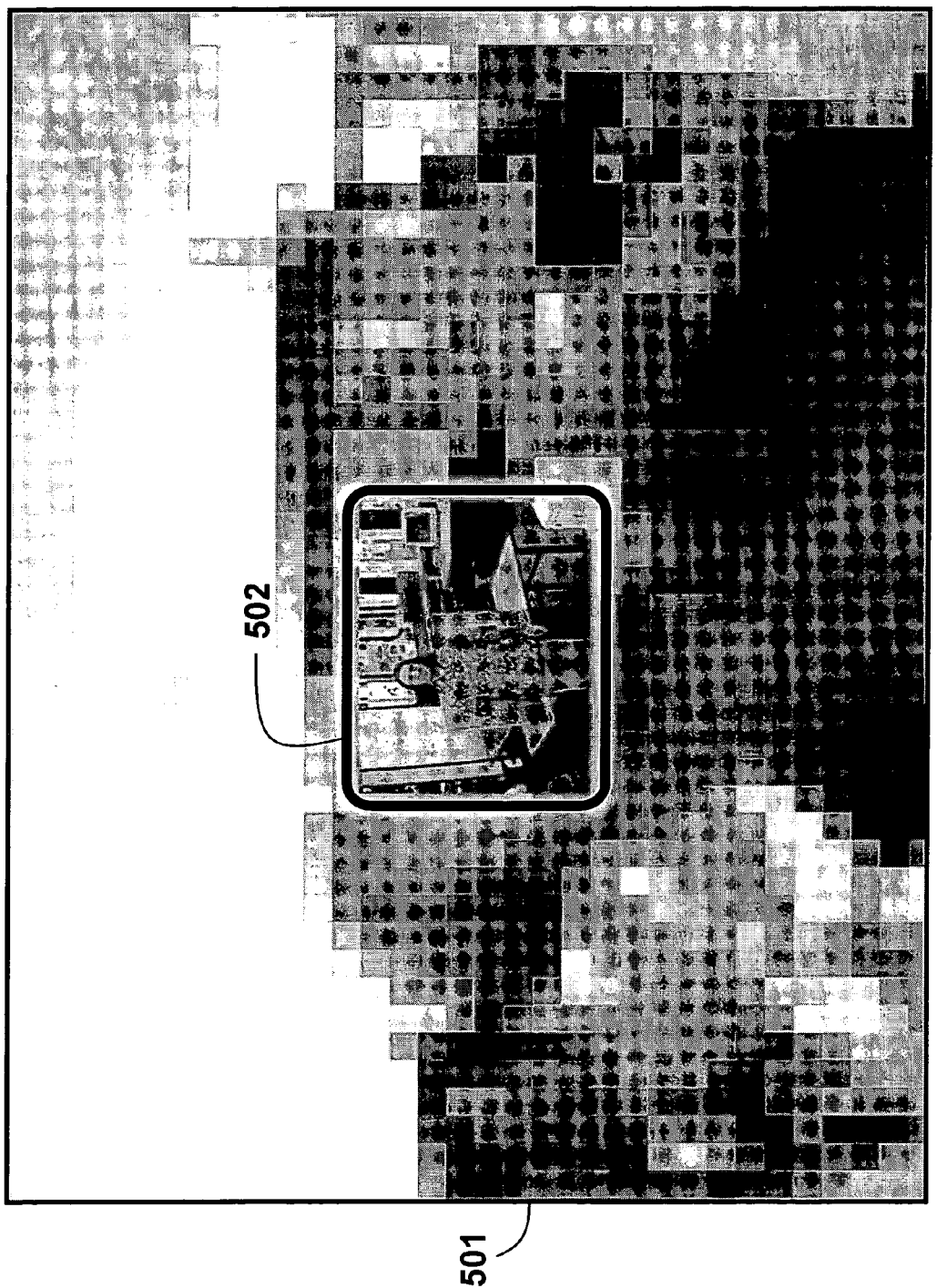
FIG. 5 is a composited image obtained from an omni-directional PZT camera.

As shown in FIG. 5, it is also possible to construct a low detail panoramic output image 501 from previously acquired OD images of the scene. Then, a high detail PZT image 502 of just the event can be composited into the panoramic image 501, as shown. The composited image with the inset 502 provides the viewer with a context of the event in the scene as a whole.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for acquiring images of a scene with a composite camera, comprising:
   acquiring omni-directional images of a scene with an omni-directional imager of the composite camera;
   expressing a relationship between pixels in the omni-directional images and locations in the scene in terms of polar coordinates;
   detecting events in the scene using the omni-directional images;
   directing a pan-tilt-zoom imager of the composite camera at the events in the scene using the relationship of the pixels and the locations expressed in the polar coordinates; and
   acquiring pan-tilt-zoom images of the event with the pan-tilt-zoom imager.

2. The method of claim 1, in which optical centers of the omni-directional imager and the pan-tilt-zoom imager are substantially colocated.

3. The method of claim 1, in which the omni-directional imager includes catadioptric components.

4. The method of claim 1, further comprising:
   arranging multiple omni-directional imagers at a circumference about an optical center of the composite camera.

5. The method of claim 1, in which the relationship expressed as:

$$\phi = \arctan((y-y_0)/(x-x_0))$$

$$\theta = \arctan(\mathrm{sqrt}((y-y_0)^2+(x-x_0)^2)/h),$$

where $\phi$ and $\theta$ are the polar coordinates of an incoming light ray imaged at a pixel (x, y), and a tuple $(x_0, y_0, h)$ are calibration parameters.

6. The method of claim 5, in which the calibration parameters are predetermined.

7. The method of claim 1, further comprising:
   determining a pair of offset parameters $(\phi_0, \theta_0)$ from the omni-directional images, the offset parameters corresponding to pan and tilt coordinates for directing the pan-tilt-zoom imager at the events.

8. The method of claim 1, further comprising:
applying computer vision techniques to the omni-directional images to detect the events.

9. The method of claim 8, in which the computer vision techniques include object detection.

10. The method of claim 8, in which the computer vision techniques include object recognition.

11. The method of claim 8, in which the computer vision techniques include object tracking.

12. The method of claim 8, further comprising:
pre-warping the omni-directional images to the polar coordinates before applying the computer vision techniques.

13. The method of claim 1, further comprising:
providing a real-world local up direction based on the omni-directional images.

14. The method of claim 1, further comprising:
determining a size of a region in the scene that includes the events;
zooming the pan-tilt-zoom imager to the size of the region.

15. The method of claim 14, in which the zooming further comprises:
setting a focal length f of the pan-tilt-zoom imager according to a field of view $\alpha$ according to:

$$f=\frac{1}{2}\arctan(\alpha).$$

16. The method of claim 1, further comprising:
constructing a panoramic image from the omni-directional images;
acquiring a high detail pan-tilt-zoom image of the event; and
compositing the high detail pan-tilt-zoom image into the panoramic image.

17. An apparatus for acquiring images of a scene, comprising:
an omni-directional imager of a composite camera configured to acquire omni-directional images of a scene;
means for expressing a relationship between pixels in the omni-directional images and locations in the scene in terms of polar coordinates;
means for detecting events in the scene using the omni-directional images; and
means for directing a pan-tilt-zoom imager of the composite camera at the events in the scene using the relationship between the pixels and the locations expressed in the polar coordinates.

18. The apparatus of claim 17, in which optical centers of the omni-directional imager and the pan-tilt-zoom imager are substantially colocated.

19. The apparatus of claim 17, in which the omni-directional imager includes catadioptric components.

20. The apparatus of claim 17, in which the omni-directional imager includes multiple imagers arranged at a circumference about an optical center of the composite camera.

21. The apparatus of claim 17, in which the relationship expressed as:

$$\phi=\arctan((y-y_0)/(x-x_0))$$

$$\theta=\arctan(\mathrm{sqrt}((y-y_0)^2+(x-x_0)^2)/h),$$

where $\phi$ and $\theta$ are the polar coordinates of an incoming light ray imaged at a pixel (x, y), and a tuple $(x_0, y_0, h)$ are calibration parameters.

22. The apparatus of claim 21, in which the calibration parameters are predetermined.

23. The apparatus of claim 17, further comprising:
means for determining a pair of offset parameters $(\phi_0, \theta_0)$ from the omni-directional images, the offset parameters corresponding to pan and tilt coordinates for directing the pan-tilt-zoom imager at the events.

24. The apparatus of claim 17, in which the means for detecting includes computer vision techniques.

25. The apparatus of claim 24, in which the computer vision techniques include object detection.

26. The apparatus of claim 24, in which the computer vision techniques include object recognition.

27. The apparatus of claim 24, in which the computer vision techniques include object tracking.

28. The apparatus of claim 24, further comprising:
means for pre-warping the omni-directional images to the polar coordinates before applying the computer vision techniques.

29. The apparatus of claim 17, further comprising:
means for determining a size of a region in the scene that includes the events; and
means for zooming the pan-tilt-zoom imager to the size of the region.

30. The apparatus of claim 17, in which the zooming further comprises:
means for setting a focal length f of the pan-tilt-zoom imager according to a field of view $\alpha$ according to:

$$f=\frac{1}{2}\arctan(\alpha).$$

31. The apparatus of claim 17, further comprising:
constructing a panoramic image from the omni-directional images;
acquiring a high detail pan-tilt-zoom image of the event; and
compositing the high detail pan-tilt-zoom image into the panoramic image.

* * * * *